US012595862B2

(12) United States Patent
Pallerla et al.

(10) Patent No.: US 12,595,862 B2
(45) Date of Patent: Apr. 7, 2026

(54) VENT ASSEMBLY FOR A SEALED ENCLOSURE

(71) Applicant: Rivian IP Holdings, LLC, Irvine, CA (US)

(72) Inventors: Karteek Pallerla, Irvine, CA (US); Atul Arun Sonawane, Irvine, CA (US); Youngbin Lim, Irvine, CA (US); Stephen John Johanson, New Malden (GB)

(73) Assignee: Rivian IP Holdings, LLC, Irvine, CA (US)

( * ) Notice: Subject to any disclaimer, the term of this patent is extended or adjusted under 35 U.S.C. 154(b) by 85 days.

(21) Appl. No.: 18/585,990

(22) Filed: Feb. 23, 2024

(65) Prior Publication Data

US 2025/0271071 A1     Aug. 28, 2025

(51) Int. Cl.
*F16K 17/19*      (2006.01)
*F16K 27/02*      (2006.01)
*H01M 50/325*     (2021.01)

(52) U.S. Cl.
CPC .......... *F16K 17/19* (2013.01); *F16K 27/0209* (2013.01); *H01M 50/325* (2021.01)

(58) Field of Classification Search
CPC .... F16K 15/1401; F16K 15/148; F16K 24/04; F16K 24/06; F16K 27/0209; F16K 7/164; F16K 7/19; F16K 17/164; F16K 17/19; H01M 50/325
See application file for complete search history.

(56) References Cited

U.S. PATENT DOCUMENTS

| | | | | |
|---|---|---|---|---|
| 11,047,508 B2 * | 6/2021 | Sanders | .................. | F16K 24/04 |
| 11,226,044 B2 * | 1/2022 | Nakayama | .............. | F16K 17/02 |
| 11,796,076 B1 * | 10/2023 | Clericus | ................ | F16K 15/148 |
| 2023/0235829 A1 * | 7/2023 | Bommineni | ...... | H01M 50/3425 |
| | | | | 137/68.19 |
| 2023/0323973 A1 * | 10/2023 | Pfeiffer | ................. | F16K 17/363 |

* cited by examiner

*Primary Examiner* — Hailey K. Do
(74) *Attorney, Agent, or Firm* — Patterson + Sheridan, LLP

(57) ABSTRACT

A vent assembly for a sealed enclosure, such as a battery enclosure for an electric vehicle, is provided. The vent assembly includes a housing, a first valve, a second valve, and a protective cover. The housing includes a first valve mount and a second valve mount. The first valve is attached the first valve mount, and the second valve is attached to the second valve mount. A bracket may also be included. The bracket includes a body and support arms extending from the body. The support arms are attached to an inner surface of the housing. The support arms are configured to attach the housing to an enclosure surface. The first valve is a unidirectional valve, while the second valve may be an equalization valve or a unidirectional valve.

23 Claims, 12 Drawing Sheets

VENT ASSEMBLY FOR A SEALED ENCLOSURE

INTRODUCTION

The present disclosure relates to electric vehicles (EVs). More particularly, the present disclosure relates to battery enclosures for electric vehicles.

SUMMARY

Embodiments of the present disclosure advantageously provide a vent assembly for a sealed enclosure, such as a battery enclosure for an electric vehicle.

In certain embodiments, a vent assembly includes a housing, a unidirectional valve, an equalization valve, and a protective cover. The housing includes a first valve mount and a second valve mount. The first valve mount defines a first valve opening and a first flow opening surrounding the first valve opening. The second valve mount defines a second valve opening. The unidirectional valve is attached to the first valve mount, and the equalization valve is attached to the second valve mount. In certain embodiments, the vent assembly may also include a bracket that has a body and support arms that extend from the body. The support arms are attached to a first surface of the housing, and are configured to attach the housing to an enclosure surface.

In certain embodiments, a vent assembly includes a housing, a first unidirectional valve, a second unidirectional valve, and a protective cover. The housing includes a first valve mount and a second valve mount. The first valve mount defines a first valve opening and a first flow opening surrounding the first valve opening. The second valve mount defines a second valve opening and a second flow opening surrounding the second valve opening. The first unidirectional valve is attached to the first valve mount, and the second unidirectional valve is attached to the second valve mount. In certain embodiments, the vent assembly may also include a bracket that has a body and support arms that extend from the body. The support arms are attached to a first surface of the housing, and are configured to attach the housing to an enclosure surface.

DETAILED DESCRIPTION

Figure 1:
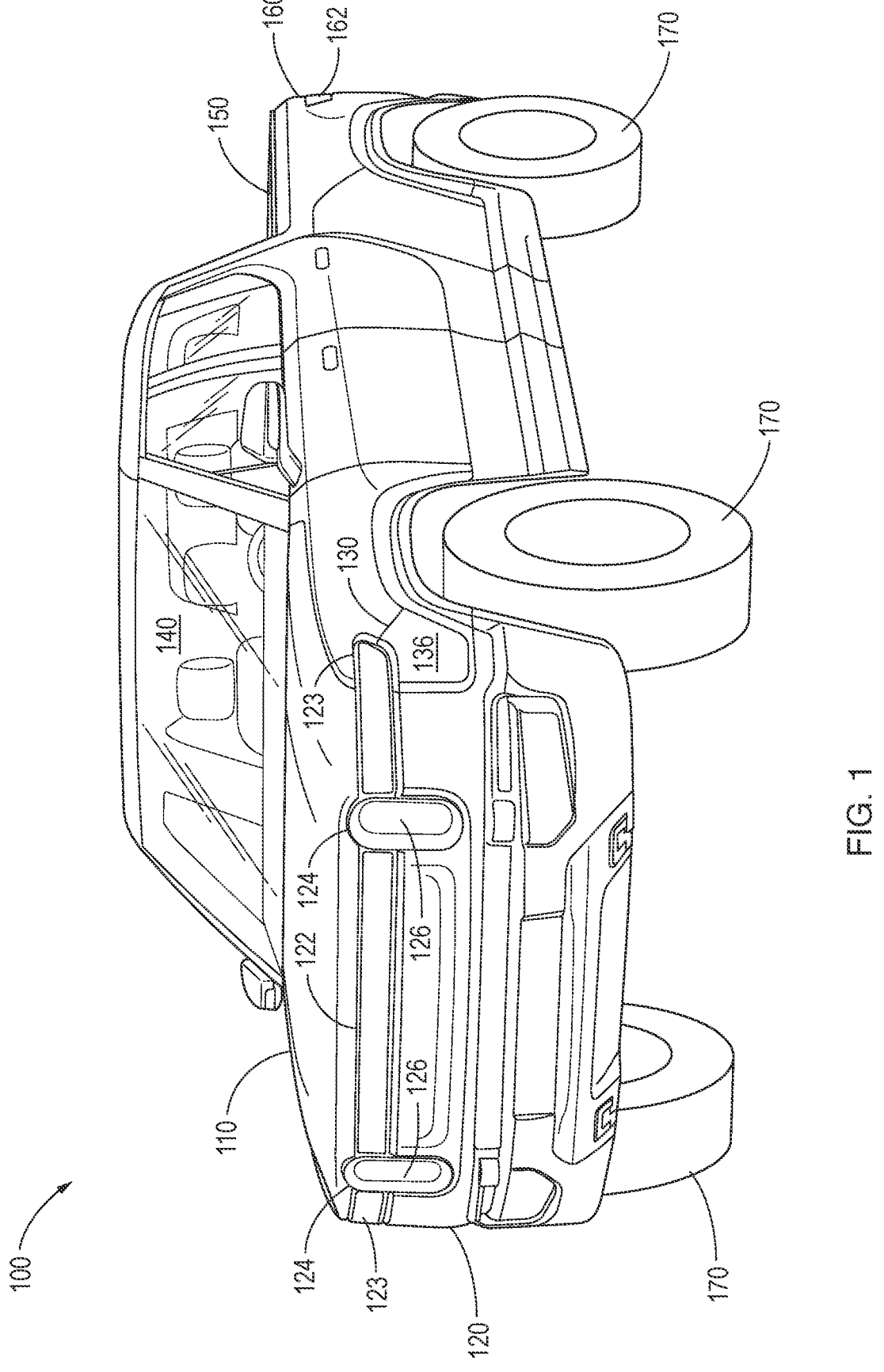
FIG. 1 depicts a diagram of an example electric vehicle, in accordance with embodiments of the present disclosure.

This disclosure is generally directed to a vent assembly for a sealed enclosure, such as a battery enclosure for an electric vehicle.

A battery enclosure for an electric vehicle provides a sealed housing to protect the battery pack from exposure to water, dust, debris and other elements. In one example, the battery enclosure may include, inter alia, a battery pack, a bottom tray that supports the battery pack, a frame attached to the bottom tray, and a top cover (or tub) attached to the frame (and/or the bottom tray). In another example, the battery enclosure may include a battery pack, a bottom tub that supports the battery pack, a frame attached to the bottom tub, and a top cover (or tray) attached to the frame (and/or the bottom tub).

The top cover may be sealed to the bottom tray (or tub), and the frame may include one or more longitudinal members that are located within the enclosed space formed by the top cover and the bottom tray or tub. Alternatively, the frame may include transverse and longitudinal members that form a rectangular outer frame, the top cover may be sealed to the upper surface of the frame, and the bottom tray or tub may be sealed to the lower surface of the frame. Additionally, one or more cooling plates may be attached to, or integrally formed with, the bottom tray (or tub) and/or the top cover. Alternatively, one or more cooling plates may be attached to the sides of the battery pack, located within the battery pack, etc.

In a further example, the battery enclosure may include a battery pack, a top tub that supports the battery pack, a frame attached to the top tub, and a bottom cover (or tray) attached to the frame (and/or the top tub). Other configurations of the battery enclosure are also possible.

A battery enclosure for an electric vehicle has strict structural and sealing requirements. The structural requirements may include, inter alia, a satisfactory reaction to an impact load, such as an underside impact (e.g., an impact to the underside of the vehicle), a side pole impact, a frontal offset impact, etc. The sealing requirements may include, inter alia, protection against water ingress, remaining sealed through 5 minutes of thermal runaway, etc.

Importantly, the battery enclosure not only equalizes the air pressure within the enclosed space to accommodate gradual changes in atmospheric pressure outside the enclosed space, but also vents overpressure conditions caused by thermal runaway events to the atmosphere.

Embodiments of the present disclosure advantageously provide a vent assembly for a sealed enclosure, such as a battery enclosure for an electric vehicle. The vent assembly includes a housing, a first valve, a second valve, and a bracket. The housing includes a first valve mount and a second valve mount. The first valve mount defines a first valve opening and a first flow opening that surrounds the first valve opening. The second valve mount defines at least a second valve opening. The first valve is a unidirectional valve. In certain embodiments, the second valve may be an equalization valve. In other embodiments, the second valve may be a unidirectional valve, and the second valve mount may also include a second flow opening that surrounds the second valve opening. The bracket includes a body and support arms that extend from the body. The support arms are attached to a first surface of the housing (such as an inner surface of the housing), and are configured to attach the housing to an enclosure surface.

An equalization valve (such as a breather valve, a breather membrane, etc.) does not need a flow opening, and not only equalizes the air pressure within the sealed enclosure, but also prevents moisture from being admitted to the sealed enclosure. A unidirectional valve (such as an umbrella valve, etc.) vents overpressure conditions within the sealed enclosure to the atmosphere and prevents oxygen from being admitted to the sealed enclosure.

In certain embodiments, a protective cover may be attached to a second surface of the housing (such as an outer surface of the housing) to protect the first and second valves from debris, etc. The protective cover may include at least one rectangular slit that begins on the perimeter (outer edge) of the protective cover and extends inward a relatively short distance (such as 5 mm, 10 mm, 15 mm, etc.). The rectangular slit(s) mitigate the transmission of shock and vibration to the protective cover to avoid damage, such as tears, adhesive releases, etc. The rectangular slit may also promote the opening, tearing, etc., of the protective cover to allow the unidirectional valve to open during an overpressure event, such as thermal runaway, etc. Other slit shapes and locations are also supported, such as a "+" shape or an "x" shape disposed in the center of the protective cover, etc. The protective cover may be plastic film with adhesive applied along the perimeter, double-sided tape, etc.

FIG. 1 depicts a diagram of electric vehicle 100, in accordance with embodiments of the present disclosure.

Electric vehicle 100 includes, inter alia, a frame and body 110, an electrical power storage and distribution system, a propulsion system, a suspension system, a steering system, auxiliary and accessory systems (such as thermal management, lighting, wireless communications, navigation, etc.), etc.

Generally, body 110 may be directly or indirectly mounted to a frame (i.e., body-on-frame construction), or body 110 may be formed integrally with a frame (i.e., unibody construction). Body 110 includes, inter alia, front end 120, front light bar 122, front turn lights 123, stadium light ring 124, headlights 126, charging port 130 with charging port cover 136 concealing charging connector socket, driver/passenger compartment or cabin 140, bed 150, rear end 160 with rear tail lights 162, a rear light bar, etc. Electric vehicle 100 may be a pickup truck, a sport utility vehicle (SUV) in which bed 150 is replaced by an extension of cabin 140, or a sedan in which bed 150 is replaced by a trunk. In certain embodiments, electric vehicle may be an electric delivery vehicle, an electric cargo van, etc.

The propulsion system may include, inter alia, one or more electronic control units (ECUs), one or more electronic drive units (EDUs), wheels 170, etc. The electrical power storage and distribution system may include, inter alia, one or more ECUs, a battery enclosure containing a battery pack including one or more batteries or battery modules, a vehicle charging subsystem including charging port 130, high voltage (HV) cables, etc.

Figure 2A:
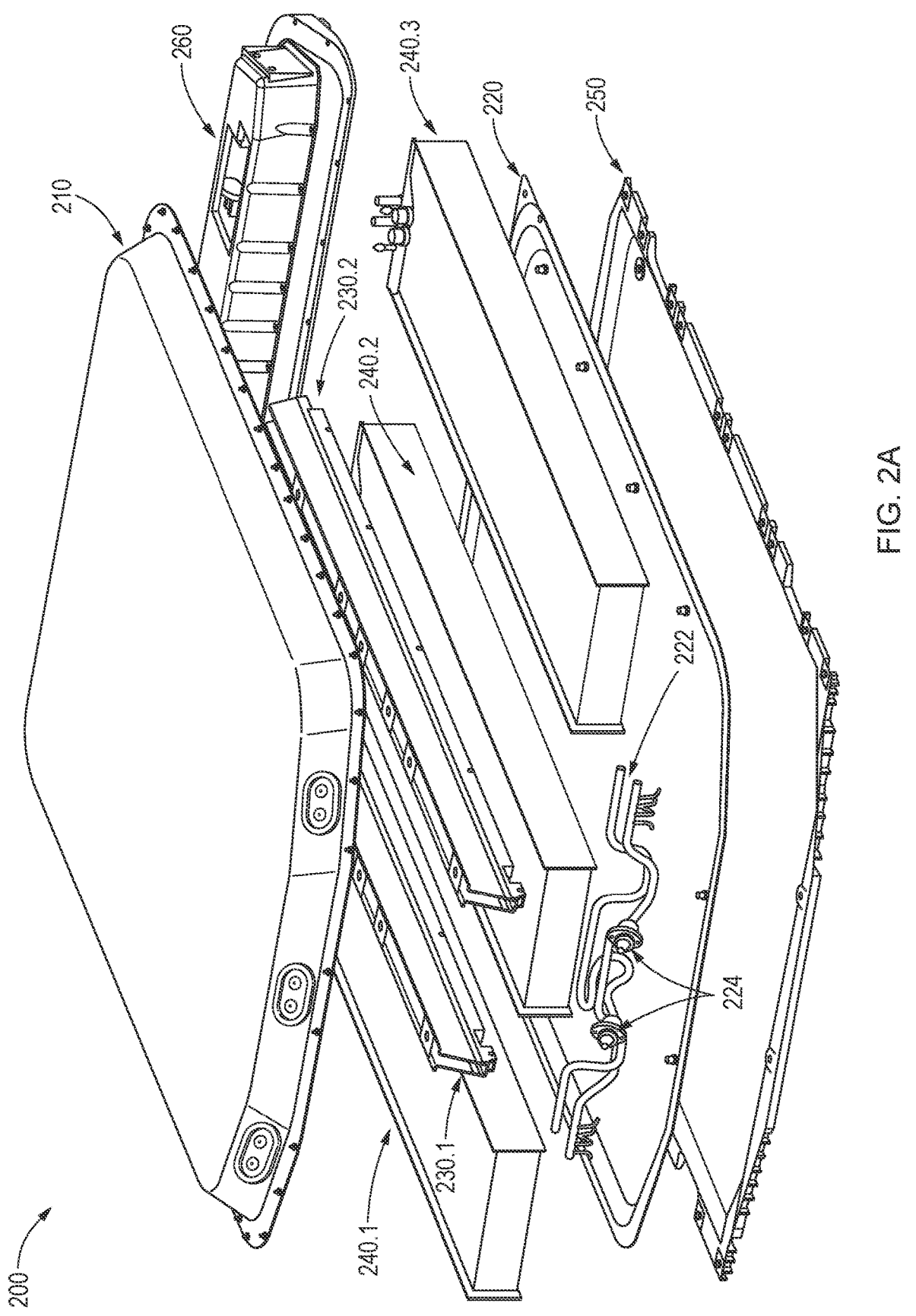
FIG. 2A presents an exploded perspective view of an example battery enclosure, in accordance with embodiments of the present disclosure.

FIG. 2A presents an exploded perspective view of battery enclosure 200, in accordance with embodiments of the present disclosure.

In certain embodiments, battery enclosure 200 includes, inter alia, top cover 210, bottom tray 220, frame members 230.1, 230.2, batteries 240.1, 240.2, 240.3, lower plate 250, and electronics enclosure 260. Top cover 210 is attached to bottom tray 220, frame members 230.1, 230.2 are attached to top cover 210 and bottom tray 220, batteries 240.1, 240.2, 240.3 are attached to bottom tray 220, and lower plate 250 is attached to bottom tray 220 using fasteners, such as screws, bolts and nuts, rivets, snap-fit clips, pins, etc. Battery enclosure 200 has a generally rectangular shape, with a front side, a left side, a right side, and a rear side.

Top cover 210 may be a cold stamped steel deep drawn cover, while bottom tray 220 may be a hot stamped steel tray. A sealing material may be disposed between top cover 210 and bottom tray 220 to provide a continuous seal along the periphery of battery enclosure 200. The sealing material may protect against water intrusion, thermal runaway, etc., as noted above. In certain embodiments, three vent assemblies 300 may be mounted to the front side of top cover 210 (also depicted in FIG. 2B), and three vent assemblies 400 may be mounted to the rear side of top cover 210 (depicted in FIG. 2C). In other embodiments, other numbers of vent assemblies 300, 400 and mounting locations can be implemented.

A cooling plate may be attached to, or integrally formed with, bottom tray 220. Coolant manifold 222 may be attached to bottom tray 220 and coupled to the cooling plate, while coolant inlet couplings 224 may be attached to top cover 210 and coupled to coolant manifold 222.

Frame members 230.1, 230.2 may be longitudinal steel members that are located within the enclosed space formed by top cover 210 and bottom tray 220.

Batteries 240.1, 240.2, 240.3 form the battery pack, and each battery 240.1, 240.2, 240.3 may include a number of battery cells, such as cylindrical cells, prismatic cells, pouch cells, etc. In certain embodiments, each battery 240.1, 240.2, 240.3 may be a battery module.

Lower plate 250 and electronics enclosure 260 may be formed from a composite material. Generally, lower plate 250 protects bottom tray 220 from road or road debris damage.

Electronics enclosure 260 may be mounted on top cover 210, and may contain certain electrical power system components, such as an energy management module (EMM), a high voltage distribution box (HVDB), etc., coupled to batteries 240.1, 240.2, 240.3.

Figure 2B:
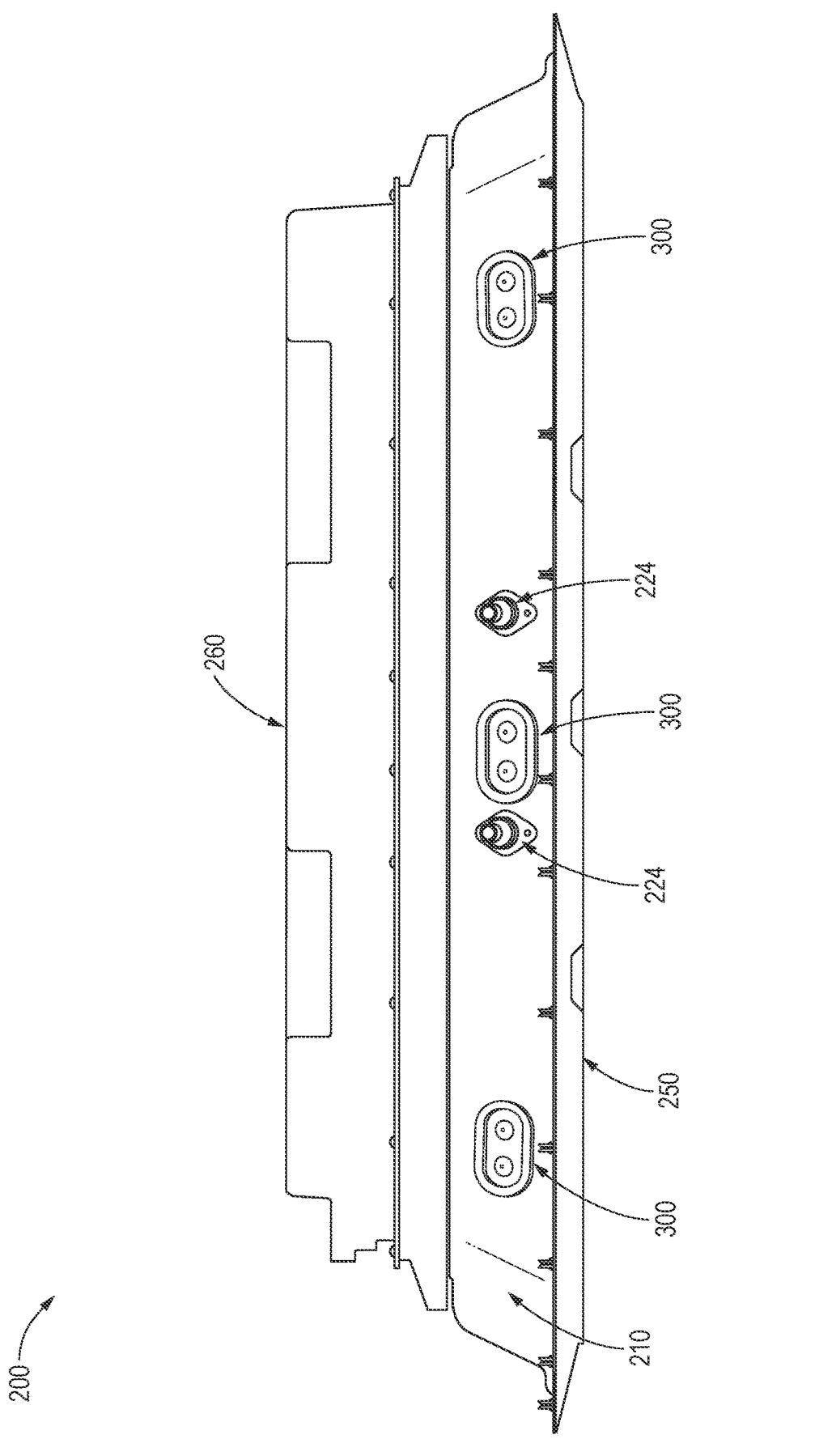
FIGS. 2B, 2C present front and rear views of the example battery enclosure (respectively), in accordance with embodiments of the present disclosure.
Figure 2C:
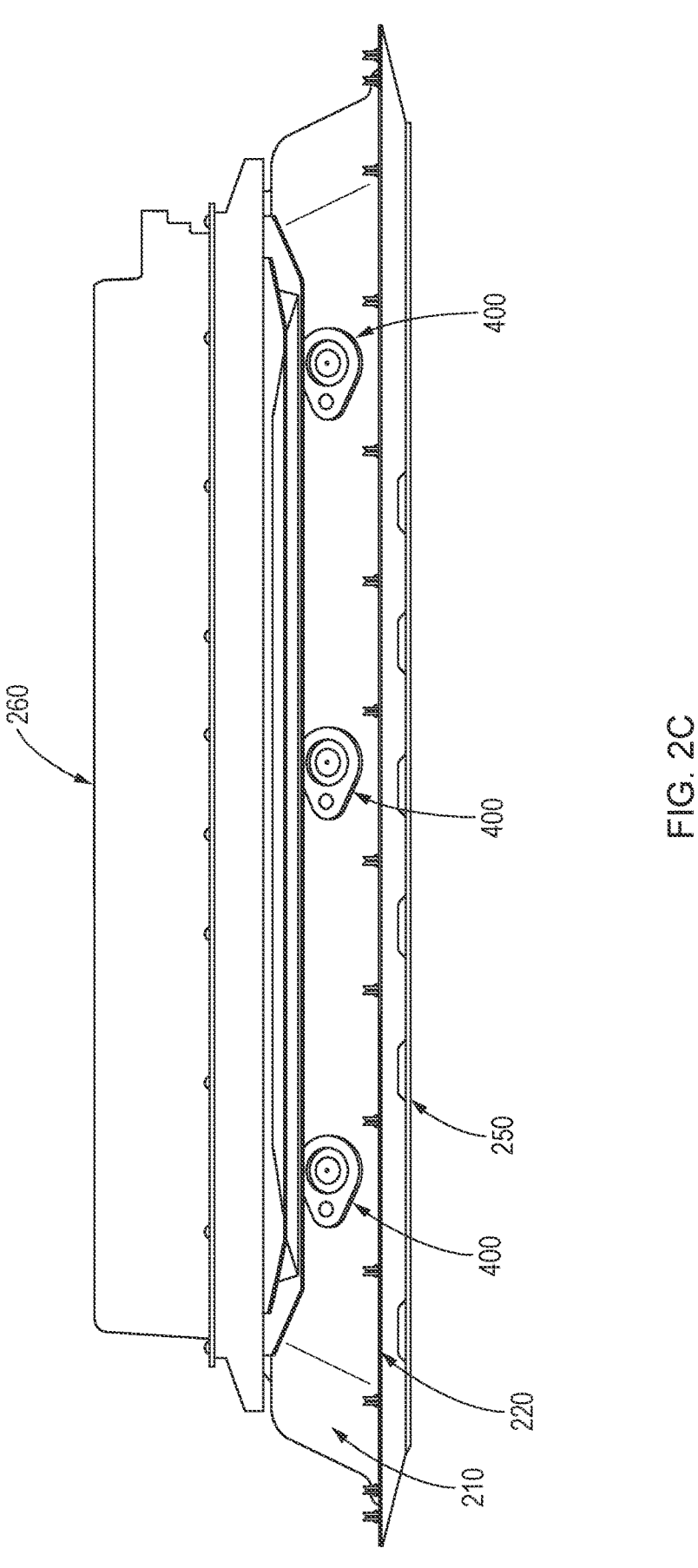

FIGS. 2B, 2C present front and rear views of battery enclosure 200 (respectively), in accordance with embodiments of the present disclosure.

As depicted in FIG. 2B, vent assemblies 300 and coolant inlet couplings 224 are mounted to the front side of top cover 210. Lower plate 250 and electronics enclosure 260 are also visible. While three vent assembly 300 are depicted, a different number of vent assemblies 300 may be attached to the front side of top cover 210, such as one, two, four, etc. Additionally, vent assemblies 400 (depicted in FIG. 2C) may be mounted to the front side of top cover 210, or a combination of vent assemblies 300 and vent assemblies 400 may be mounted to the front side of top cover 210.

As depicted in FIG. 2C, vent assemblies 400 are mounted to the rear side of top cover 210. A portion of bottom tray 220, lower plate 250, and electronics enclosure 260 are also visible. While three vent assembly 400 are depicted, a different number of vent assemblies 400 may be attached to the rear side of top cover 210, such as one, two, four, etc. Additionally, vent assemblies 300 (depicted in FIG. 2B) may be mounted to the rear side of top cover 210, or a combination of vent assemblies 300 and vent assemblies 400 may be mounted to the rear side of top cover 210.

Figure 3A:
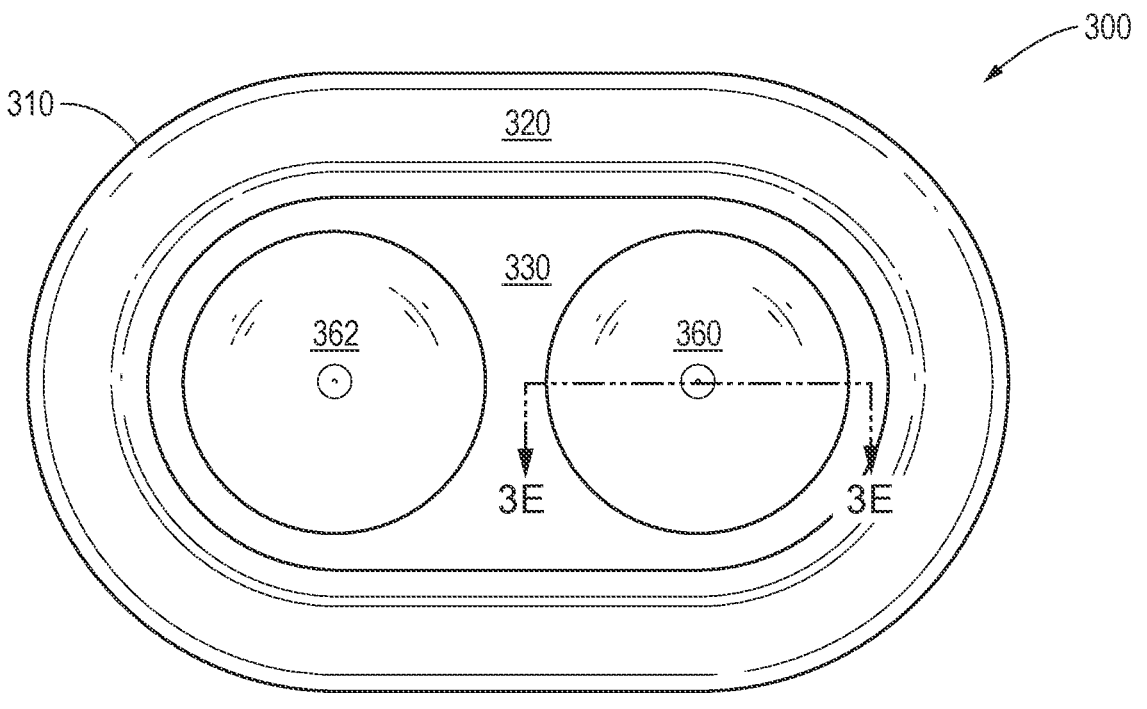
FIGS. 3A, 3B present top and bottom views of an example vent assembly (respectively), in accordance with embodiments of the present disclosure.
Figure 3B:
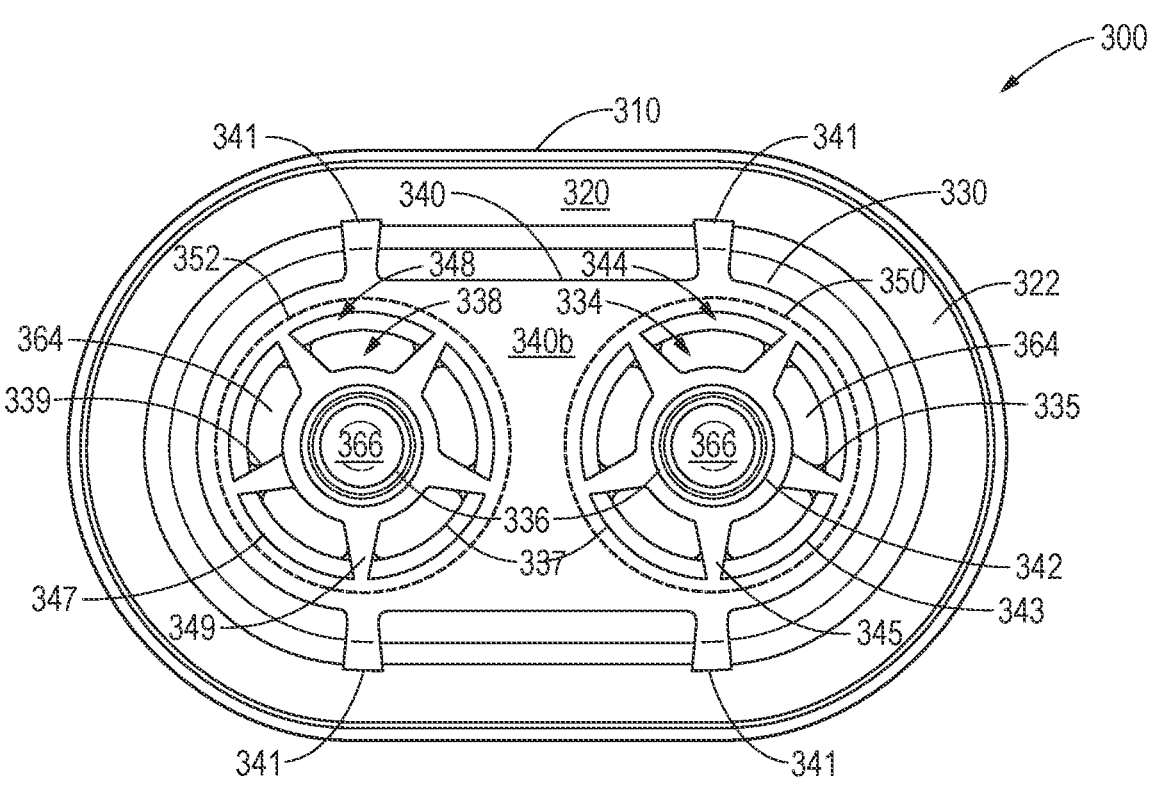

FIGS. 3A, 3B present top and bottom views of vent assembly 300 (respectively), in accordance with embodiments of the present disclosure.

FIG. 3A presents a top view of vent assembly 300, in which the external surfaces and components of vent assembly 300 are depicted. When vent assembly 300 is mounted and sealed to battery enclosure 200, the external surfaces and components of vent assembly 300 are exposed to the atmosphere.

Vent assembly 300 includes, inter alia, housing 310, outer portion 320, inner portion 330, bracket 340 (FIG. 3B), unidirectional valve 360, and unidirectional valve 362.

Housing 310 may be mild steel (such as nickel-coated steel, zinc-coated steel, etc.), aluminum, etc. Housing 310 may be formed by a cold-stamping process, a hot-stamping process, etc. Similarly, bracket 340 may be mild steel, aluminum, etc., and may be formed by a cold-stamping process, a hot-stamping process, etc. Bracket 340 may be attached to housing 310 by welding, adhesive bond, etc. In certain embodiments, housing 310 and bracket 340 may be formed from plastic, such as injection-molded plastic, etc., and may be attached using heat staking or other assembly joining processes.

FIG. 3B presents a bottom view of vent assembly 300, in which the internal surfaces and components of vent assembly 300 are depicted. When vent assembly 300 is mounted and sealed to battery enclosure 200, certain internal surfaces and components of vent assembly 300 are exposed to the enclosed space (or interior) of battery enclosure 200, while other surfaces and components contact the external surface of battery enclosure 200.

In certain embodiments, adhesive 322 may be applied to the bottom surface of outer portion 320. When vent assembly 300 is mounted to battery enclosure 200, adhesive 322 secures and seals housing 310 to the external surface of battery enclosure 200. In other embodiments, a sealing material may be applied to the bottom surface of outer portion 320 instead of adhesive 322. When vent assembly 300 is mounted to battery enclosure 200, the sealing material seals housing 310 to battery enclosure 200, while bracket 340 secures housing 310 to battery enclosure 200, as described below.

Adhesive 322 may be a urethane adhesive, an acrylic adhesive, double-sided, pressure sensitive adhesive (PSA) tape, 2-part epoxy, etc. Generally, adhesive 322 may have a width of 4 mm, 7 mm, 10 mm, etc., and a thickness of 1.5 mm, 2 mm, 2.5 mm, 3.5 mm, etc. In certain embodiments, adhesive 322 may have a coverage area of between about 1,500 mm$^2$ and about 3,400 mm$^2$, and may withstand a pressure of about 50 kPa, which translates to a tensile stress of about 10 psi to about 20 psi.

Inner portion 330 extends from outer portion 320, and includes valve mount 350 and valve mount 352. In FIG. 3A, inner portion 330 is recessed with respect to outer portion 320, while in FIG. 3B, inner portion 330 is raised with respect to outer portion 320.

Figure 5A:
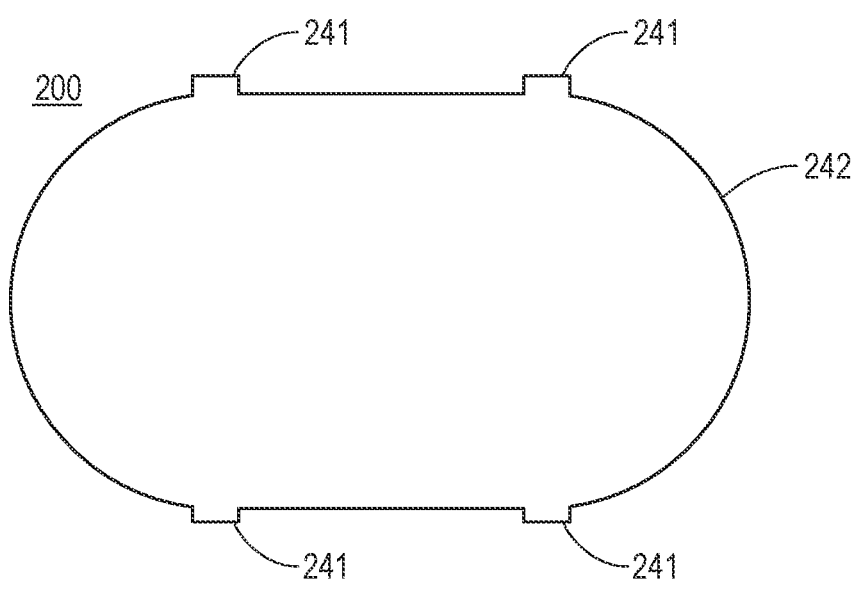
FIGS. 5A, 5B present two top views of example openings for mounting vent assemblies (respectively) in a battery enclosure, in accordance with embodiments of the present disclosure.

Bracket 340 includes body 340b and support arms 341. In certain embodiments, body 340b may contact inner portion 330, while in other embodiments, body 340b may be separated from inner portion 330 by a small air gap, such as 1 mm, 3 mm, 5 mm, etc. Support arms 341 extend from body 340b and attach to outer portion 320. Advantageously, support arms 341 are configured to be received by mounting recesses when vent assembly 300 is mounted in an opening in battery enclosure 200, such as recesses 241 that are adjacent to opening 242 (as depicted in FIG. 5A). Generally, support arms 341 cooperate with recesses 241 to align vent assembly 300 in opening 242. In certain embodiments, support arms 341 may also provide a predetermined clamping force.

In certain embodiments, support arms 341 align vent assembly 300 within opening 242, and adhesive 322 secures vent assembly 300 to battery enclosure 200. In certain embodiments, support arms 341 align vent assembly 300 within opening 242, and both support arms 341 and adhesive 322 secure vent assembly 300 to battery enclosure 200. In certain embodiments, support arms 341 aligns and secures vent assembly 300 to battery enclosure 200, while a sealing material seals vent assembly 300 to battery enclosure 200.

Unidirectional valve 360 is mounted to valve mount 350, and unidirectional valve 362 is mounted to valve mount 352. Referring to FIG. 3E, unidirectional valves 360, 362 may be umbrella valves that include valve disc 364, valve stem 365 that extends from valve disc 364, and end portion 366 that is disposed on the end of valve stem 365. End portion 366 has a truncated cone shape, and is configured to engage valve mount 350 and valve mount 352. Generally, unidirectional valves 360, 362 are made from a deformable material, such as elastomer rubber, silicone, fluorosilicone, liquid silicone rubber (LSR), etc.

Referring back to FIG. 3B with respect to valve mount 350, inner portion 330 defines valve opening 332 and flow opening 334 that surrounds valve opening 332. Valve stem 365 of unidirectional valve 360 is disposed within valve opening 332, and end portion 366 of unidirectional valve 360 engages the inner surface of inner portion 330 (FIGS. 3E, 3F). In certain embodiments, flow opening 334 includes a number of flow opening segments 333, such as two segments, three segments, four segments, five segments (depicted in FIG. 3B), six segments, etc. Flow opening segments 333 are separated by a number of flow opening arms 335 (portions visible), such as two arms, three arms, four arms, five arms (depicted in FIG. 3B), six arms, etc.

With respect to valve mount 350, bracket 340 defines valve passage 342 and flow opening 344 that surrounds valve passage 342. In certain embodiments, flow opening 344 includes a number of flow opening segments 343, such as two segments, three segments, four segments, five segments (depicted in FIG. 3B), six segments, etc. Flow opening segments 343 are separated by a number of flow opening arms 345, such as two arms, three arms, four arms, five arms (depicted in FIG. 3B), six arms, etc. Generally, flow opening arms 345 align with flow opening arms 335, valve passage 342 is larger than valve opening 332, and flow opening 344 is larger than flow opening 334.

Similarly, with respect to valve mount 352, inner portion 330 defines valve opening 336 and flow opening 338 that surrounds valve opening 336. Valve stem 365 of unidirectional valve 362 is disposed within valve opening 336, and end portion 366 of unidirectional valve 360 engages the inner surface of inner portion 330 (FIGS. 3E, 3F). In certain embodiments, flow opening 338 includes a number of flow opening segments 337, such as two segments, three segments, four segments, five segments (depicted in FIG. 3B), six segments, etc. Flow opening segments 337 are separated by a number of flow opening arms 339 (portions visible), such as two arms, three arms, four arms, five arms (depicted in FIG. 3B), six arms, etc.

With respect to valve mount 352, bracket 340 defines valve passage 346 and flow opening 348 that surrounds valve passage 346. In certain embodiments, flow opening 348 includes a number of flow opening segments 347, such as two segments, three segments, four segments, five segments (depicted in FIG. 3B), six segments, etc. Flow opening segments 347 are separated by a number of flow opening arms 349, such as two arms, three arms, four arms, five arms (depicted in FIG. 3B), six arms, etc. Generally, flow opening arms 349 align with flow opening arms 339, valve passage 346 is larger than valve opening 336, and flow opening 348 is larger than flow opening 338.

Figure 3C:
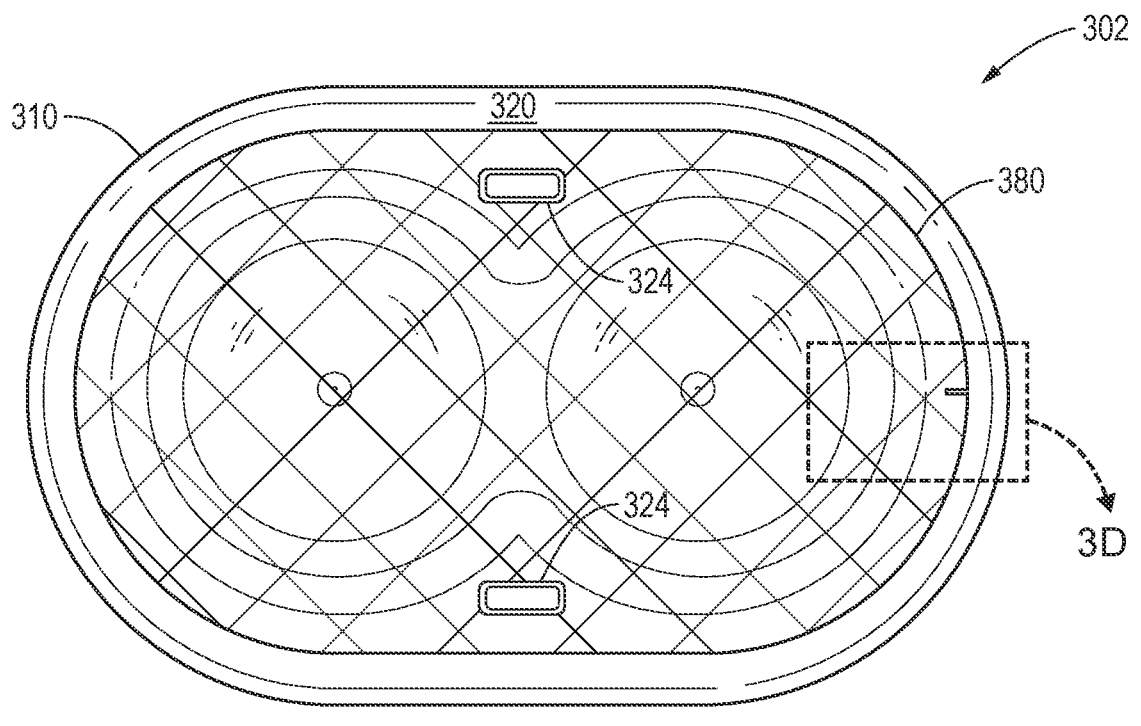
FIGS. 3C, 3D present a top view and a close-up view of the example vent assembly (respectively), in accordance with embodiments of the present disclosure.
Figure 3D:
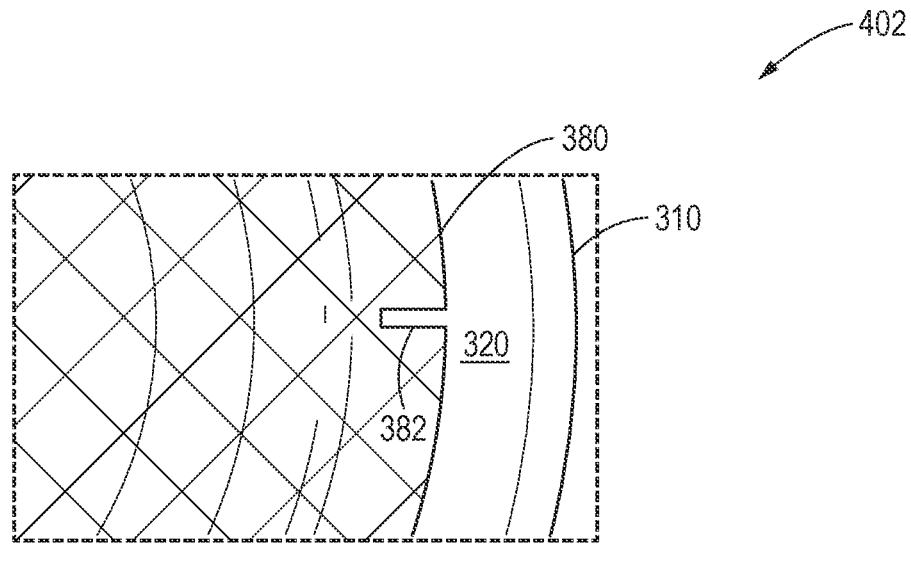
Figure 3E:
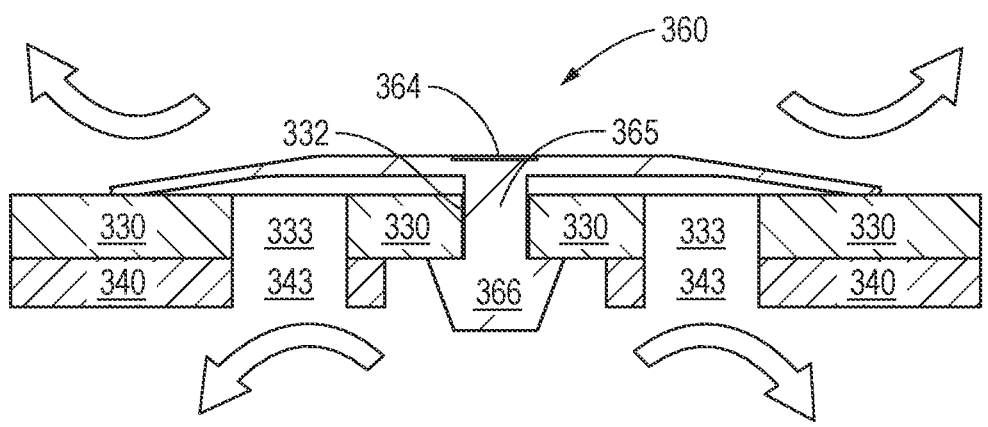
FIGS. 3E, 3F present cross-sectional views of an example unidirectional valve in a closed position and an open position (respectively), in accordance with embodiments of the present disclosure.
Figure 3F:
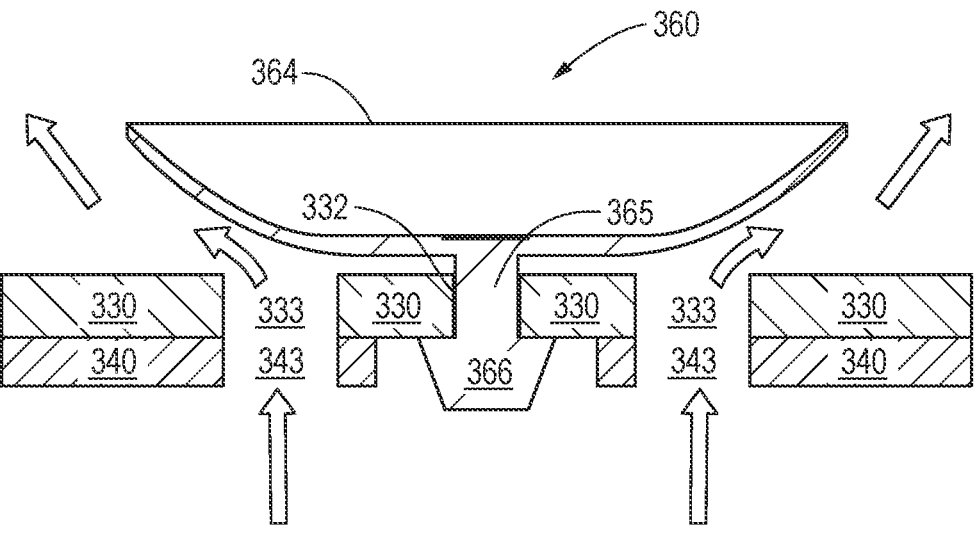

FIGS. 3C, 3D present a top view and a close-up view of vent assembly 302 (respectively), in accordance with embodiments of the present disclosure.

Vent assembly 302 includes all of the elements of vent assembly 300 described above with respect to FIGS. 3A, 3B. Housing 310 and outer portion 320 are identified.

In certain embodiments, vent assembly 302 may include protective cover 380 disposed over unidirectional valves 360, 362, inner portion 330, and about half of outer portion 320. Protective cover 380 protects unidirectional valves 360, 362 from debris, etc. Generally, protective cover 380 may be secured to outer portion 320 using adhesive. For example, protective cover 380 may be a plastic film with adhesive along the perimeter, double-sided tape, etc. The thickness of protective cover may be about 0.3 mm, 0.5 mm, 0.7 mm, etc.

In certain embodiments, protective cover 380 may include at least one rectangular slit 382 that begins on the perimeter (outer edge) of protective cover 380 and extends inward toward unidirectional valves 360, 362 a relatively short distance (such as 5 mm, 10 mm, 15 mm, etc.). Rectangular slit 382 may mitigate the transmission of shock and vibration to protective cover 380 to avoid damage, such as tears, adhesive releases, etc. Other slit shapes and locations are also supported, such as a "+" shape or an "x" shape disposed in the center of protective cover 380, etc.

In certain embodiments, outer portion 320 may include two or more bosses 324 that extend upward from the surface of outer portion 320. Each boss defines an inner cavity in which one support arm 341 of bracket 340 may be secured. Advantageously, boss 324 is not located in the coverage area of adhesive 322, and the support arm 341 that is secured within boss 324 may have an extended length to provide additional clamping force.

FIGS. 3E, 3F present cross-sectional views of unidirectional valve 360 in a closed position and an open position (respectively), in accordance with embodiments of the present disclosure.

As discussed above, unidirectional valve 360 may be an umbrella valve that includes valve disc 364, valve stem 365 that extends from valve disc 364, and end portion 366 that is disposed on the end of valve stem 365. End portion 366 has a truncated cone shape. Valve stem 365 is disposed within valve opening 332, and end portion 366 engages the surface of inner portion 330.

FIG. 3E depicts unidirectional valve 360 in the closed position. Valve disc 364 is configured to form a seal with the surface of inner portion 330 of housing 310 to prevent airflow through flow opening segments 333 of inner portion 330 and flow opening segments 343 of bracket 340.

FIG. 3F depicts unidirectional valve 360 in the open position. Valve disc 364 is configured to extend above the surface of outer portion 320 of housing 310 to allow airflow through flow opening segments 333 of inner portion 330 and flow opening segments 343 of bracket 340. The transition from the closed position to the open position is based on the pressure difference between the enclosed space of battery enclosure 200 and the atmosphere. In certain embodiments, the pressure difference may be 1.5 to 30 kPa.

With respect to protective cover 380 described above, when unidirectional valve 360 is in the open position, protective cover 380 does not prevent airflow through flow opening segments 333 of inner portion 330 and flow opening segments 343 of bracket 340.

Figure 4A:
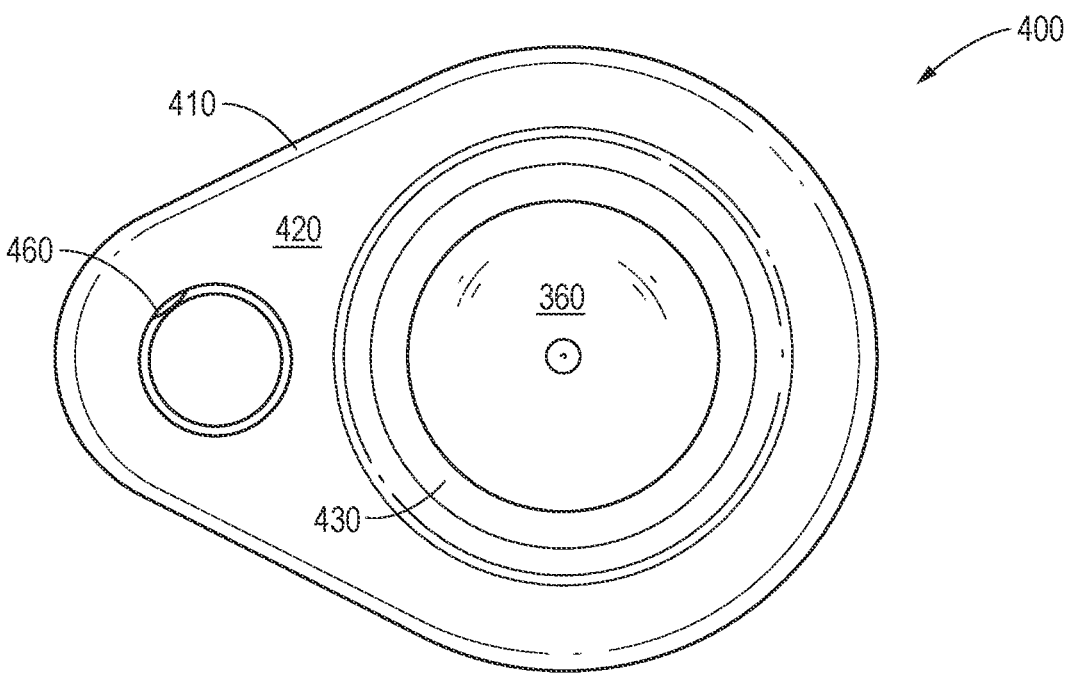
FIGS. 4A, 4B present top and bottom views of another example vent assembly (respectively), in accordance with embodiments of the present disclosure.
Figure 4B:
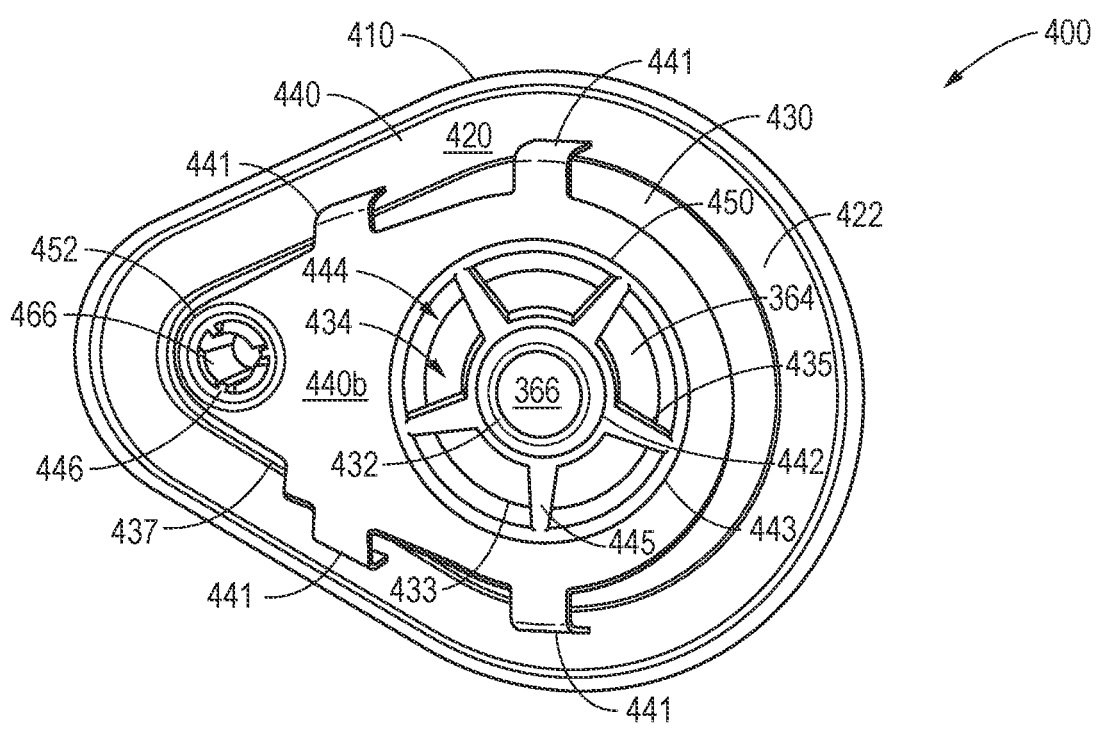

FIGS. 4A, 4B present top and bottom views of vent assembly 400 (respectively), in accordance with embodiments of the present disclosure.

FIG. 4A presents a top view of vent assembly 400, in which the external surfaces and components of vent assembly 400 are depicted. When vent assembly 400 is mounted and sealed to battery enclosure 200, the external surfaces and components of vent assembly 400 are exposed to the atmosphere.

Vent assembly 400 includes, inter alia, housing 410, outer portion 420, inner portion 430, bracket 440 (FIG. 4B), unidirectional valve 360, and equalization valve 460.

Similar to housing 310, housing 410 may be mild steel (such as nickel-coated steel, zinc-coated steel, etc.), aluminum, etc., and may be formed by cold-stamping process, a hot-stamping process, etc. Similar to bracket 340, bracket 440 may be formed from mild steel, aluminum, etc., and may be formed by cold-stamping process, a hot-stamping process, etc.

FIG. 4B presents a bottom view of vent assembly 400, in which the internal surfaces and components of vent assembly 400 are depicted, in accordance with embodiments of the present disclosure. When vent assembly 400 is mounted and sealed to battery enclosure 200, certain internal surfaces and components of vent assembly 400 are exposed to the enclosed space (or interior) of battery enclosure 200, while other surfaces and components contact the external surface of battery enclosure 200.

In certain embodiments, adhesive 422 may be applied to the bottom surface of outer portion 420. When vent assembly 400 is mounted to battery enclosure 200, adhesive 422 secures and seals housing 410 to battery enclosure 200. In other embodiments, a sealing material may be applied to the inner surface of outer portion 420 instead of adhesive 422. When vent assembly 400 is mounted to battery enclosure 200, the sealing material seals housing 410 to battery enclosure 200, while bracket 440 secures housing 410 to battery enclosure 200, as described below. Adhesive 422 is the same as adhesive 322 described above.

Inner portion 430 extends from outer portion 420, and includes valve mount 450 and valve mount 452. In FIG. 4A, inner portion 430 is recessed with respect to outer portion 420, while in FIG. 4B, inner portion 430 is raised with respect to outer portion 420.

Figure 5B:
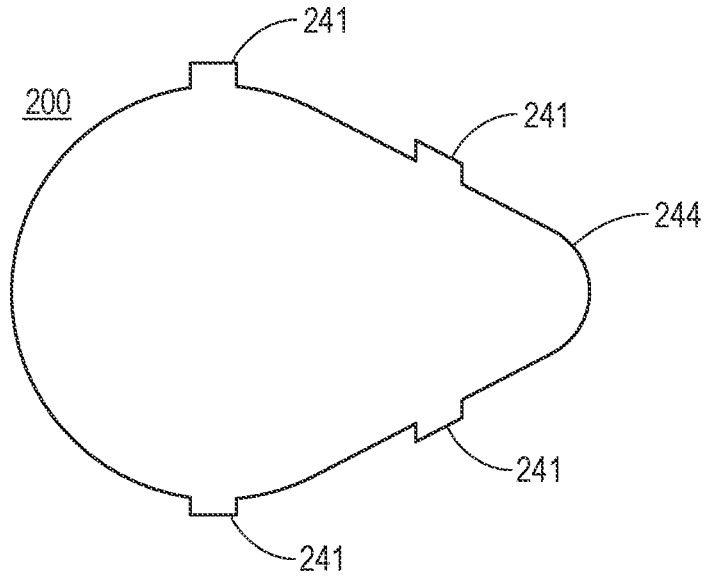

Bracket 440 includes body 440b and support arms 441. In certain embodiments, body 440b may contact inner portion 430, while in other embodiments, body 440b may be separated from inner portion 430 by a small air gap, such as 1 mm, 3 mm, 5 mm, etc. Support arms 441 extend from body 440b and attach to outer portion 420. Advantageously, support arms 441 are configured to be received by mounting recesses when vent assembly 400 is mounted in an opening in battery enclosure 200, such as recesses 241 adjacent to opening 244 (as depicted in FIG. 5B). Generally, support arms 441 cooperate with recesses 241 to align vent assembly

400 in opening 244. In certain embodiments, support arms 441 may also provide a predetermined clamping force.

In certain embodiments, support arms 441 align vent assembly 400 within opening 244, and adhesive 422 secures vent assembly 400 to battery enclosure 200. In certain embodiments, support arms 441 align vent assembly 400 within opening 244, and both support arms 441 and adhesive 422 secure vent assembly 400 to battery enclosure 200. In certain embodiments, support arms 441 aligns and secures vent assembly 400 to battery enclosure 200, while a sealing material seals vent assembly 400 to battery enclosure 200.

Unidirectional valve 360 is mounted to valve mount 450, and equalization valve 460 mounted to valve mount 452. Equalization valve 460 may be a breather valve, a breather membrane, etc. Referring to FIGS. 4E, 4F, equalization valve 460 include valve membrane 467, valve stem 465 that extends from valve membrane 467, and end portion 466 that is disposed on the end of valve stem 465. End portion 466 has a segmented cone shape, and is configured to engage valve mount 452.

Referring back to FIG. 4B with respect to valve mount 450, inner portion 430 defines valve opening 432 and flow opening 434 that surrounds valve opening 432. Valve stem 365 of unidirectional valve 360 is disposed within valve opening 432, and end portion 366 of unidirectional valve 360 engages the inner surface of inner portion 430. In certain embodiments, flow opening 434 includes a number of flow opening segments 433, such as two segments, three segments, four segments, five segments (depicted in FIG. 4B), six segments, etc. Flow opening segments 433 are separated by a number of flow opening arms 435 (portions visible), such as two arms, three arms, four arms, five arms (depicted in FIG. 4B), six arms, etc.

With respect to valve mount 450, bracket 440 defines valve passage 442 and flow opening 444 that surrounds valve passage 442. In certain embodiments, flow opening 444 includes a number of flow opening segments 443, such as two segments, three segments, four segments, five segments (depicted in FIG. 4B), six segments, etc. Flow opening segments 443 are separated by a number of flow opening arms 445, such as two arms, three arms, four arms, five arms (depicted in FIG. 4B), six arms, etc. Generally, flow opening arms 445 align with flow opening arms 435, valve passage 442 is larger than valve opening 432, and flow opening 444 is larger than flow opening 434.

With respect to valve mount 452, outer portion 420 defines valve opening 446. Valve stem 465 of equalization valve 460 is disposed within valve opening 446, and end portion 466 of equalization valve 460 engages the inner surface of outer portion 420.

Figure 4C:
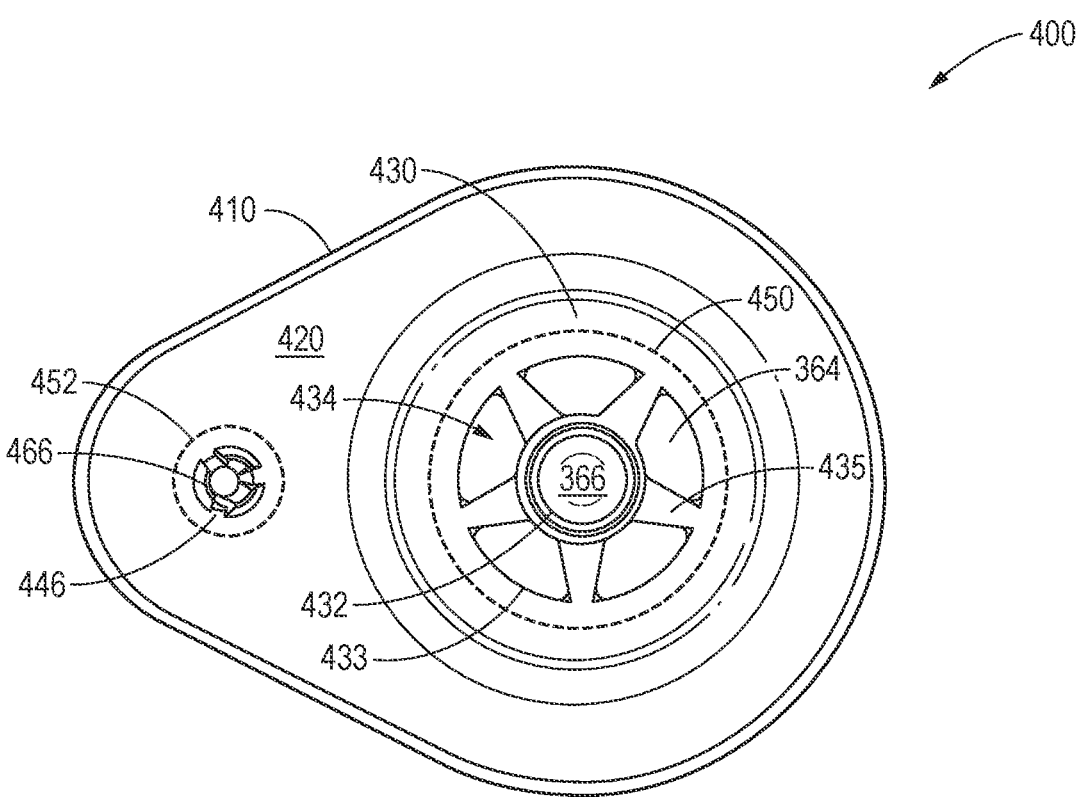
FIG. 4C presents a bottom view of the other example vent assembly without a bracket and adhesive, in accordance with embodiments of the present disclosure.

FIG. 4C presents a bottom view of vent assembly 400 without bracket 440 and adhesive 422, in accordance with embodiments of the present disclosure.

Housing 410, outer portion 420, inner portion 430, valve mount 450, and valve mount 452 are identified. With respect to unidirectional valve 360, valve disc 364 and end portion 366 are identified. With respect to equalization valve 460, end portion 466 is identified.

With respect to valve mount 450, valve opening 432, flow opening 434, flow opening segments 433 (five segments are depicted in FIG. 4C), and flow opening arms 435 (five arms are depicted in FIG. 4C) are identified.

With respect to valve mount 452, end portion 466 is identified.

Figure 4D:
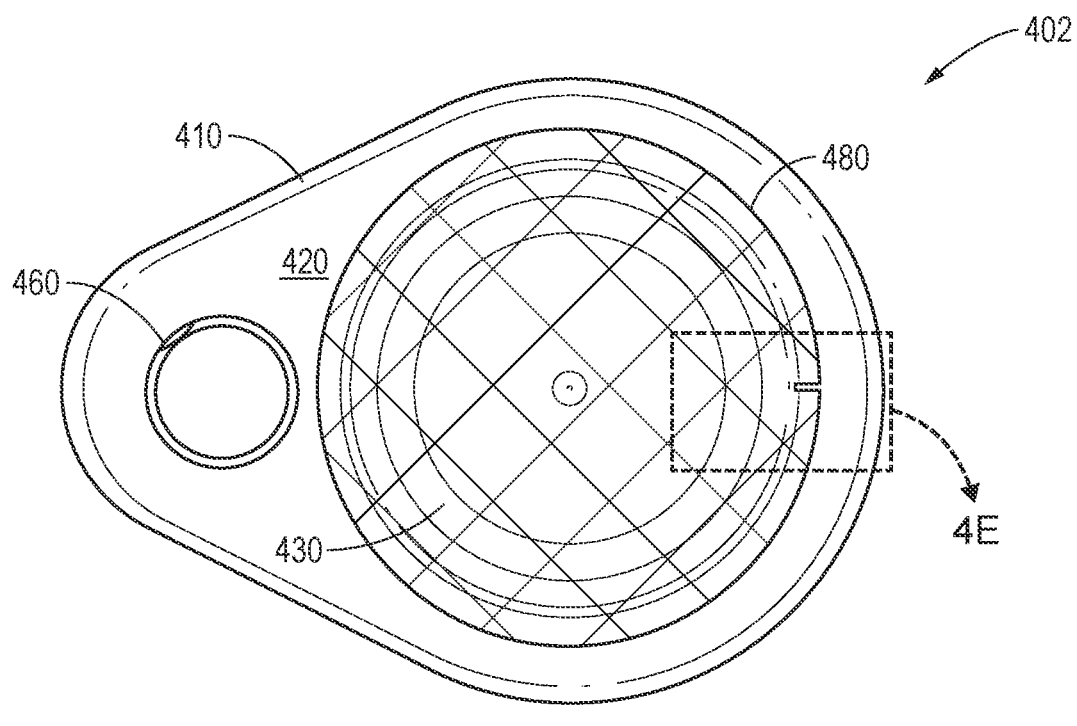
FIGS. 4D, 4E present a top view and a close-up view of the other example vent assembly (respectively), in accordance with embodiments of the present disclosure.
Figure 4E:
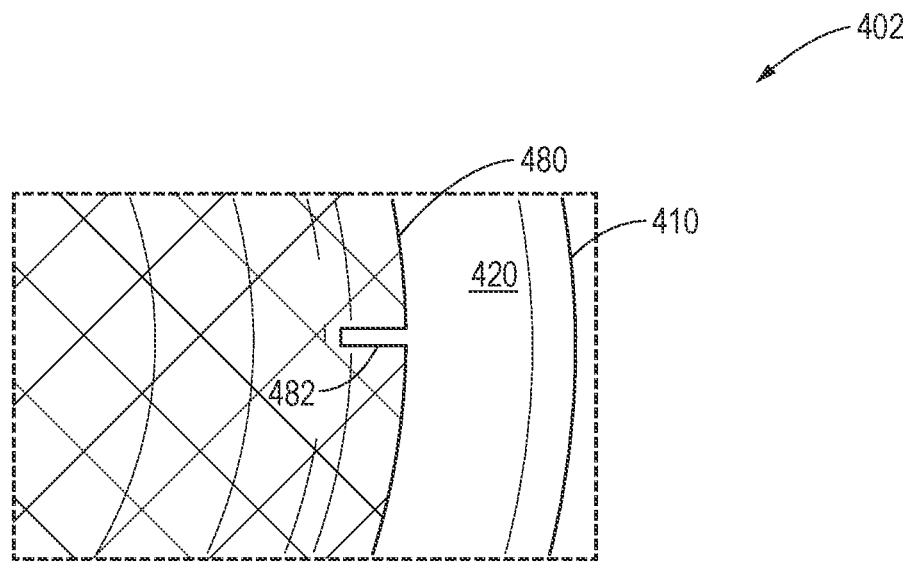
Figure 4F:
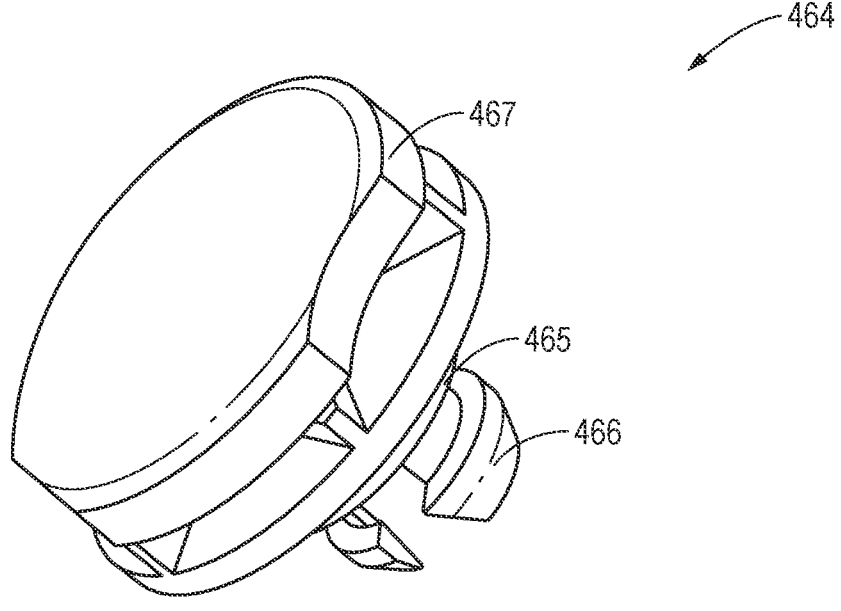
FIGS. 4F, 4G present two perspective views of an example equalization valve, in accordance with embodiments of the present disclosure.

FIGS. 4D, 4E present a top view and a close-up view of vent assembly 402 (respectively), in accordance with embodiments of the present disclosure.

Vent assembly 402 includes all of the elements of vent assembly 400 described above with respect to FIGS. 4A, 4B, 4C. Housing 410 and outer portion 420 are identified.

In certain embodiments, vent assembly 402 may include protective cover 480 disposed over unidirectional valve 360, inner portion 430, and a part of outer portion 420. Protective cover 480 protects unidirectional valve 360 from debris, etc. Generally, protective cover 480 may be secured to outer portion 420 using adhesive. For example, protective cover 480 may be a plastic film with adhesive along the perimeter, double-sided tape, etc. The thickness of protective cover may be about 0.1 mm to about 2 mm, such as 0.3 mm, 0.5 mm, 0.7 mm, etc.

In certain embodiments, protective cover 480 may include at least one rectangular slit 482 that begins on the perimeter (outer edge) of protective cover 480 and extends inward toward unidirectional valve 360 a relatively short distance (such as 5 mm, 10 mm, 15 mm, etc.). Rectangular slit 482 may mitigate the transmission of shock and vibration to protective cover 480 to avoid damage, such as tears, adhesive releases, etc. Other slit shapes and locations along the periphery are also supported, such as a "+" shape or an "x" shape disposed in the center of protective cover 480, etc.

Figure 4G:
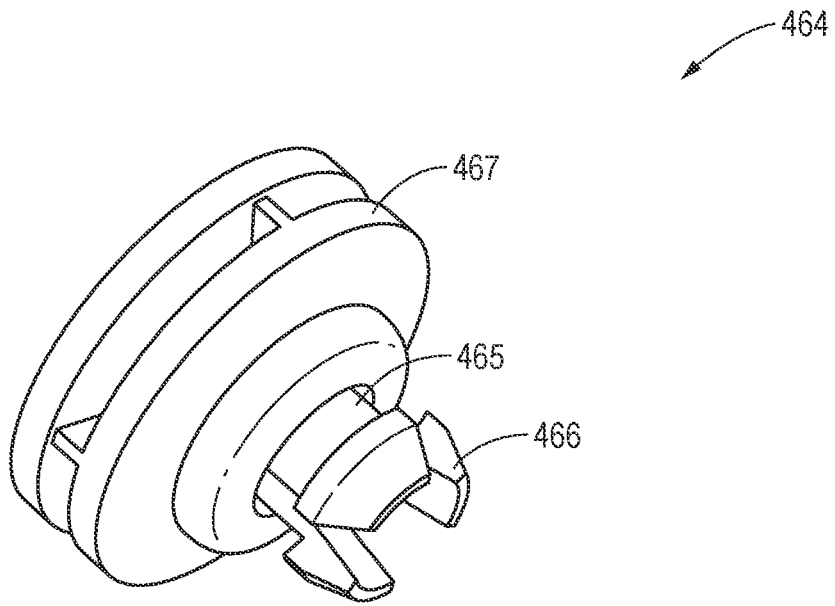

FIGS. 4F, 4G present two perspective views of equalization valve 460, in accordance with embodiments of the present disclosure.

As discussed above, equalization valve 460 includes valve membrane 467, valve stem 465 that extends from valve membrane 467, and end portion 466 that is disposed on the end of valve stem 465. End portion 466 has a segmented cone shape, and is configured to engage valve mount 452.

FIGS. 5A, 5B present two top views of openings 242, 244 for mounting vent assemblies 300, 400 (respectively) in battery enclosure 200, in accordance with embodiments of the present disclosure.

Opening 242 is generally the same shape as housing 310 but smaller overall, and includes a recess 241 for each support arm 341 of vent assembly 300, 302.

Similarly, opening 244 is generally the same shape as housing 410 but smaller overall, and includes a recess 241 for each support arm 441 of vent assembly 400, 402.

Generally, the features described above for vent assemblies 300, 302, 400, 402 provide many advantages. Fasteners, such as bolts, etc., are not required to secure vent assemblies 300, 302, 400, 402 to battery enclosure 200. Vent assemblies 300, 302, 400, 402 are easy to assemble, repair, and rework from the outside of battery enclosure 200. Unidirectional valves 360, 362 minimize $O_2$ intrusion during thermal propagation and venting. Vent assemblies 300, 302, 400, 402 have a minimal form factor, and are generally agnostic to the surface flatness, surface roughness, manufacturing process (such as extrusion, casting, stamping, composite, etc.) of battery enclosure 200. Vent assemblies 300, 302, 400, 402 may be installed using a wedge to direct the gas outflow in a particular direction, such as up, down, or to the side of battery enclosure 200. Flow opening arms 345, 349 of bracket 340 may be shaped to redirect gas outflow through flow opening segments 333 in a particular direction, such as up, down, or to the side of battery enclosure 200.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A vent assembly, comprising:
a housing comprising:
   a first valve mount defining a first valve opening and a first flow opening surrounding the first valve opening, and
   a second valve mount defining a second valve opening;
a unidirectional valve attached to the first valve mount, the unidirectional valve comprising:
   a valve disc, and
   a valve stem extending from the valve disc and disposed within the first valve opening, the valve stem including an end portion that engages the first valve mount;
an equalization valve attached to the second valve mount; and
a bracket comprising:
   a body, and
   support arms extending from the body and attached to a second surface of the housing, the support arms configured to align the housing to an enclosure surface,
wherein:
   when the unidirectional valve is disposed in an open position, the valve disc is configured to extend above a first surface of the housing to allow airflow through the first flow opening, and
   when the unidirectional valve is disposed in a closed position, the valve disc is configured to form a seal with the first surface of the housing to prevent airflow through the first flow opening.

2. The vent assembly of claim 1, wherein the body of the bracket defines:
   a first valve passage that is larger than the first valve opening of the first valve mount;
   a second flow opening that is larger than the first flow opening of the first valve mount; and
   a second valve passage that is larger than the second valve opening of the second valve mount.

3. The vent assembly of claim 1, further comprising adhesive disposed on a second surface of the housing, the adhesive configured to attach and seal the housing to the enclosure surface.

4. The vent assembly of claim 1, wherein the support arms are configured to provide a predetermined clamping force.

5. The vent assembly of claim 4, further comprising adhesive disposed on the second surface of the housing, the adhesive configured to attach and seal the housing to the enclosure surface.

6. The vent assembly of claim 1 further comprising a protective cover attached to the first surface of the housing above the valve disc.

7. The vent assembly of claim 6, wherein, when the unidirectional valve is disposed in the open position, the protective cover does not prevent airflow through the first flow opening.

8. The vent assembly of claim 7, wherein the first flow opening includes a plurality of flow opening segments.

9. A vent assembly, comprising:
a housing comprising:
   a first valve mount defining a first valve opening and a first flow opening surrounding the first valve opening, and a second valve mount defining a second valve opening and a second flow opening surrounding the second valve opening;
a first unidirectional valve attached to the first valve mount;
a second unidirectional valve attached to the second valve mount; and
a bracket comprising:
   a body, and
   support arms extending from the body and attached to a second surface of the housing,
wherein the support arms are configured to align the housing to an enclosure surface.

10. The vent assembly of claim 9, wherein the body of the bracket defines:
   a first valve passage that is larger than the first valve opening of the first valve mount;
   a first flow opening that is larger than the first flow opening of the first valve mount; and
   a second valve passage that is larger than the second valve opening of the second valve mount; and
   a second flow opening that is larger than a second flow opening of the second valve mount.

11. The vent assembly of claim 9, further comprising adhesive disposed on a second surface of the housing, the adhesive configured to attach and seal the housing to the enclosure surface.

12. The vent assembly of claim 9, wherein:
   each unidirectional valve includes a valve disc and a valve stem extending from the valve disc, the valve stem including an end portion;
   the valve stem for the first unidirectional valve is disposed within the first valve opening;
   the valve stem for the second unidirectional valve is disposed within the second valve opening;
   the end portion of the first unidirectional valve engages the first valve mount; and
   the end portion of the second unidirectional valve engages the second valve mount.

13. The vent assembly of claim 12, wherein:
   when the first unidirectional valve is disposed in a closed position, the valve disc is configured to form a seal with a first surface of the housing to prevent airflow through the first flow opening;
   when the first unidirectional valve is disposed in an open position, the valve disc is configured to extend above the first surface of the housing to allow airflow through the first flow opening;
   when the second unidirectional valve is disposed in the closed position, the valve disc is configured to form a seal with the first surface of the housing to prevent airflow through the second flow opening; and
   when the second unidirectional valve is disposed in the open position, the valve disc is configured to extend above the first surface of the housing to allow airflow through the second flow opening.

14. The vent assembly of claim 13, wherein the first flow opening includes a plurality of first flow opening segments, and the second flow opening includes a plurality of second flow opening segments.

15. The vent assembly of claim 9, further comprising:
   a protective cover attached to a first surface of the housing above the first and second unidirectional valves,
   wherein, when the first unidirectional valve is disposed in an open position, the protective cover does not prevent airflow through the first flow opening, and wherein, when the second unidirectional valve is disposed in an open position, the protective cover does not prevent airflow through the second flow opening.

16. The vent assembly of claim 15, wherein the support arms are configured to provide a predetermined clamping force.

17. The vent assembly of claim 16, further comprising adhesive disposed on the second surface of the housing, the adhesive configured to attach and seal the housing to the enclosure surface.

18. A method, comprising:

providing a vent assembly for a sealed enclosure, the vent assembly including:

a housing comprising:

a first valve mount defining a first valve opening and a first flow opening surrounding the first valve opening, a second valve mount defining at least a second valve opening;

a first valve attached to the first valve mount;

a second valve attached to the second valve mount; and a bracket comprising:

a body, and support arms extending from the body and attached to a second surface of the housing, wherein:

the support arms are configured to align the housing to an enclosure surface, the first valve is a unidirectional valve, the second valve is an equalization valve or a unidirectional valve, and the support arms are configured to align the housing to an enclosure surface.

19. The method of claim 18, wherein the second valve is the equalization valve.

20. The method of claim 18, wherein;

the second valve is a unidirectional valve;

the second valve mount further includes a second flow opening that surrounds the second valve opening;

the vent assembly further includes a protective cover attached to a first surface of the housing above the first valve and the second valve; and when the second valve is disposed in an open position, the protective cover does not prevent airflow through the second flow opening.

21. The method of claim 18, wherein the vent assembly further includes adhesive disposed on a second surface of the housing, the adhesive configured to attach and seal the housing to the enclosure surface.

22. The method of claim 18, wherein the vent assembly further includes:

a protective cover attached to a first surface of the housing above the first valve and the second valve, wherein, when the first valve is disposed in an open position, the protective cover does not prevent airflow through the first flow opening.

23. The method of claim 22, wherein the vent assembly further includes adhesive disposed on the second surface of the housing, the adhesive configured to attach and seal the housing to the enclosure surface.

\* \* \* \* \*